United States Patent [19]

Barnhart et al.

[11] Patent Number: 5,140,945
[45] Date of Patent: Aug. 25, 1992

[54] DISPOSABLE FEED AND WATER DISPENSER

[76] Inventors: William Barnhart, 629 Ransom St.; Steven D. Eatough, 522 Fairview Ave., both of Ripon, Wis. 54971

[21] Appl. No.: 722,146

[22] Filed: Jun. 27, 1991

[51] Int. Cl.⁵ .................. A01K 39/012; A01K 7/00
[52] U.S. Cl. .................................. 119/52.2; 119/53
[58] Field of Search ............... 119/52.2, 51.5, 77, 119/57.8, 53, 57, 72

[56] References Cited

U.S. PATENT DOCUMENTS

| | | | |
|---|---|---|---|
| 2,148,180 | 2/1959 | Teigen | 119/77 |
| 4,573,434 | 3/1986 | Gardner | 119/77 |
| 4,706,851 | 11/1987 | Hegedus et al. | 119/57.8 |
| 4,732,112 | 3/1988 | Fenner et al. | 119/52.2 |
| 4,896,628 | 1/1990 | Kadunce | 119/52.2 |
| 4,938,168 | 7/1990 | Meidell | 119/77 |

*Primary Examiner*—John G. Weiss
*Attorney, Agent, or Firm*—Donald Cayen

[57] ABSTRACT

A disposable feed and water dispenser comprises a recycleable PET container with a threaded neck and a recycleable tray suspended from the container. The tray has a roof with a hole therethrough that mates with the container neck threads and a platform parallel to and spaced below the roof. Seed flowing out the container neck is collected in a mound on the platform. The mound size is controlled by changing the distance between the end of the container neck and the tray platform, which is achieved by adjusting the amount of engagement of the container threads with the tray roof. The tray may be fabricated from a flat cruciform shaped blank of recyclable polyvinylchloride that is approximately folded into the tray or that is thermoformed to the desired size and configuration. The disposable feed and water dispenser may be hung from an overhead member by a pair of strips, one end of each of which is bent over 180 degrees and inserted between the container and a cup loosely fastened to the container.

22 Claims, 2 Drawing Sheets

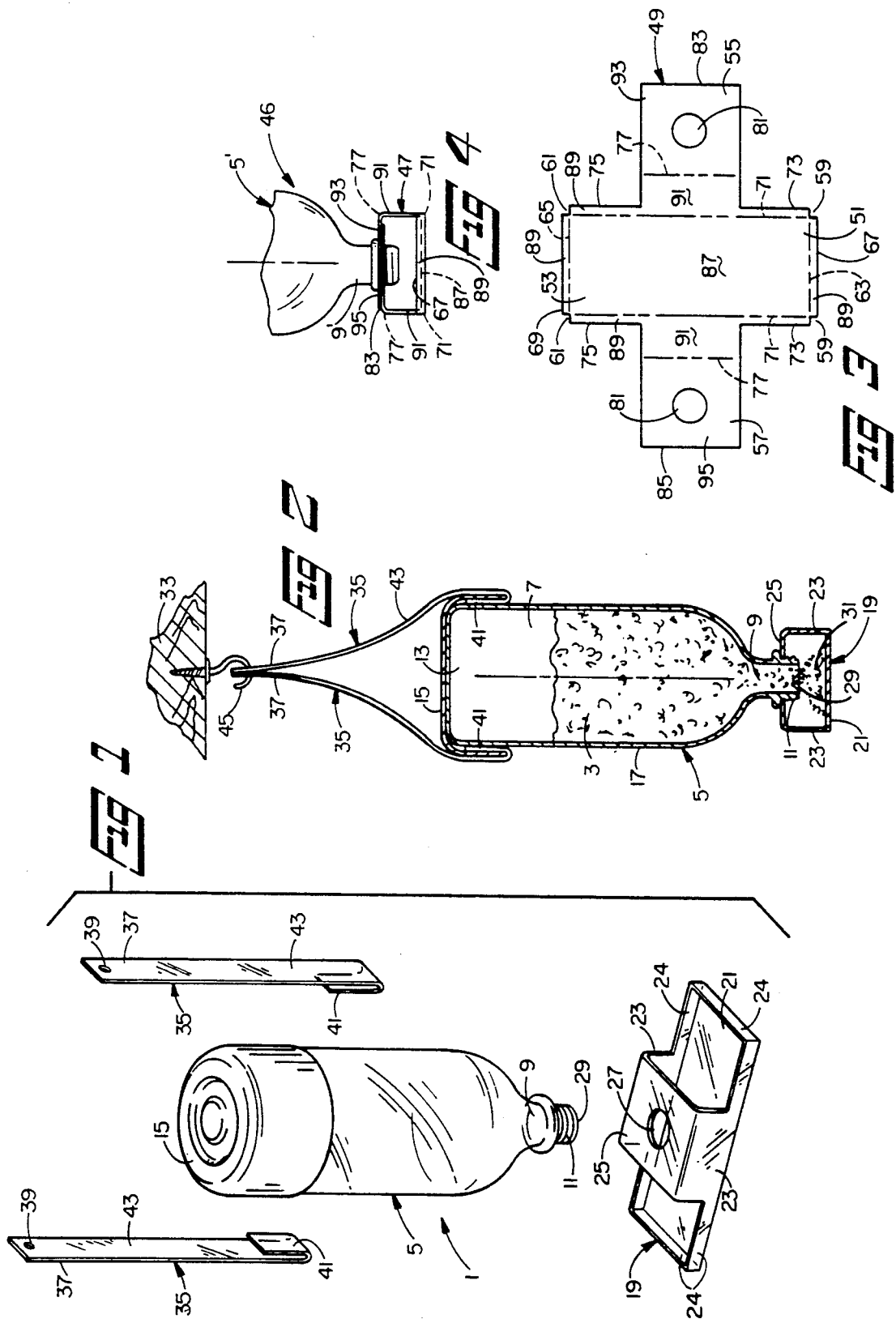

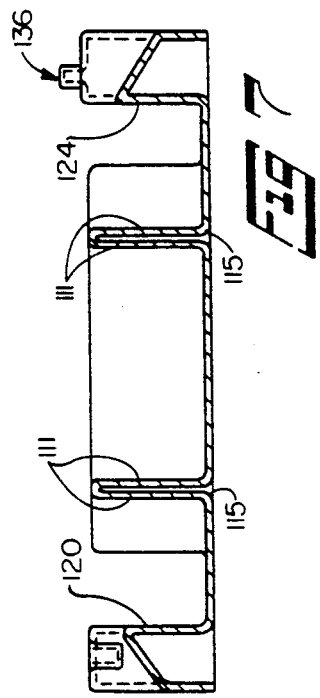
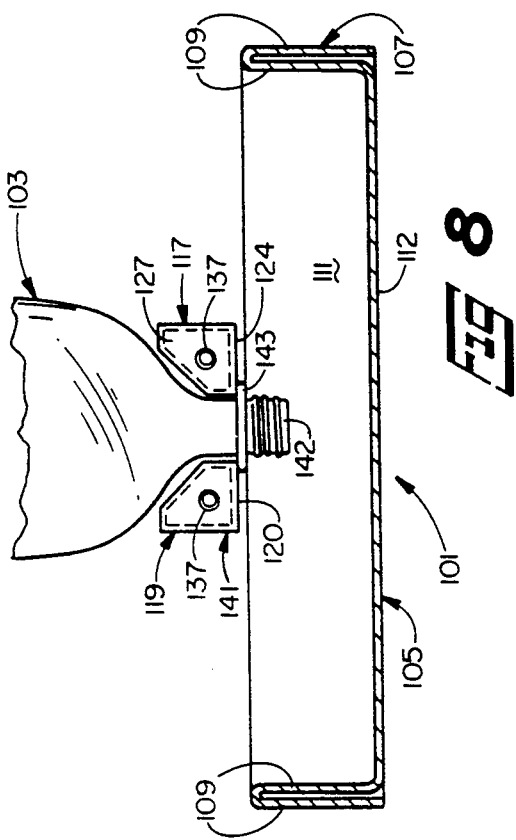
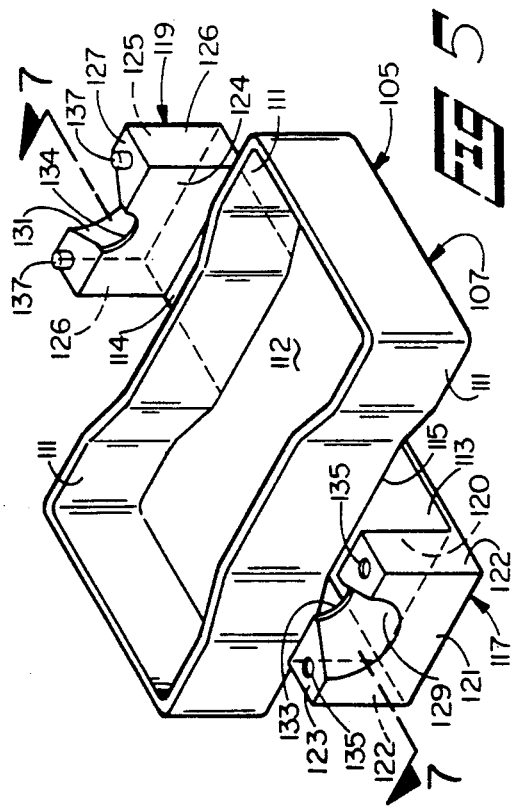
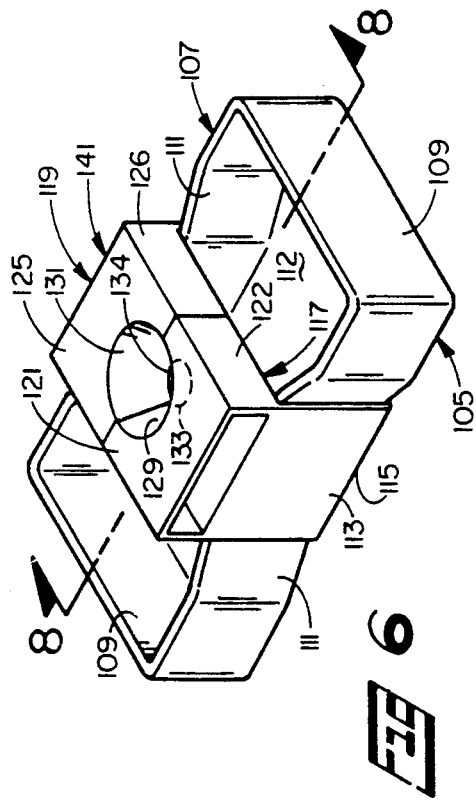

DISPOSABLE FEED AND WATER DISPENSER

BACKGROUND OF THE INVENTION

1. Field of the Invention

This invention pertains to animal care, and more particularly to apparatus for providing feed and water to wild birds.

2. Description of the Prior Art

Various products have been developed to attract birds for viewing and studying. For example, many types of bird feeders and bird baths are commercially available, and they are in widespread use.

Prior bird feeders and baths are invariably intended to hold only feed or water, respectively. Known feeders are unsuitable as a source of drinking water. Similarly, bird baths are customarily used solely for holding water.

Another characteristic of prior bird feeders is that they are usually designed as more or less permanent structures. A feeder is typically placed at a chosen location and is left there for the course of its useful life, which may be several years. During that time, the feeder is refilled many times as the seed is consumed.

Refilling prior bird feeders presents certain problems. The seed is usually bought in bulk, so it must be stored until used. In addition to occupying storage space, the stored seed must be protected from mice and the like. In addition, many prior feeders are rather difficult to refill without spilling and wasting the seed, so care must be used in the filling process.

Another problem with permanent type bird feeders is that, over time, they become quite unsightly. Constant exposure to the elements induces rot in wooden feeders. Bird droppings, water stains, dirt, and seed hulls contribute both to the rather unpleasant appearance of older feeders and to the spread of avian diseases.

A further disadvantage of prior bird feeders pertains to their ultimate disposal. When prior feeders are discarded, they invariably enter the waste stream. Although wooden and metal components may eventually decompose, that process takes a long time, during which the feeders occupy valuable landfill space. Many plastic components do not decompose. Although incineration is a potential solution, it is highly undesirable that discarded feeders enter the waste stream in the first place.

Thus, a need exists for improved products for feeding and watering birds.

SUMMARY OF THE INVENTION

In accordance with the present invention, a disposable feed and water dispenser is provided that is readily recyclable. This is accomplished by apparatus that includes a recyclable tray that is removably suspended from a recyclable container.

The container preferably has an elongated chamber with a necked opening at one end. The container neck may be threaded. A cup is fastened rather loosely around the container end opposite the neck. If desired, the container and cup may be generally similar to a commercially available beverage bottle made of PET material.

The recyclable tray of the present invention is comprised of a generally rectangular platform with walls that surround the platform periphery. Upstanding from two opposed walls of the platform are a pair of plates. Joined to and extending between the tray plates is a roof having a central opening therethrough. The roof opening mates with the threads of the container neck such that the end of the container neck is a short distance from the tray platform. The distance between the end of the container neck and the tray platform is generally governed by the height of the tray walls and plates. The actual distance between the end of the container neck and the tray platform is variable and is adjusted by the amount the neck threads are screwed into the tray roof.

The tray may be manufactured in a single operation as a molded component. Alternately, the tray may be fabricated from a thin sheet of recyclable polyvinylchloride or polyester material that is cut into a generally cruciform blank. First and second opposed arms of the blank are imperforate. The third and fourth arms have holes therethrough near their respective outer ends. The third and fourth arms are bent by a thermoforming process along respective first fold lines so as to be perpendicular to the plane of the first and second arms which make up the tray platform. Then the third and fourth arms are bent again along respective second fold lines into facing contact with each other to overlie the platform and thereby create the tray roof. The holes in the third and fourth arms are coincident, and they receive the container neck and threads.

In another embodiment, the tray is manufactured by a thermoforming process. A thin web of polyester or other recyclable material is molded within an appropriate die to form a platform, inner and outer walls, two plates, and a roof. The plates are joined along respective first fold lines to two opposed outer walls adjacent the platform. The plates have a length that is slightly greater than the height of the outer walls, and the plates are foldable so as to lie along side the outer walls. Each plate terminates in a panel that is perpendicular to the plane of the plate. The panel has a length approximately one half the width of the platform. When the plates are folded along their respective fold lines, the panels are parallel to the platform, and the free ends of the two panels closely abut. A catch arrangement is formed in the two panels to secure them to each other and thus form the tray roof. The two panels have semi circular cutouts in their respective free ends that cooperate to form a circular opening in the roof when the two panels are secured to each other by the catch arrangement. The roof opening is designed to receive the neck of the container and to engage the neck threads such that the tray is suspendable from the container.

The container is pre-filled with bird seed. With the container upright, the tray is screwed or pushed onto the container neck by means of the hole in the roof. Then the unitary container and tray are turned upside down. The seed flows by gravity through the container neck from the container chamber and collects in a mound on the platform. The seed flows out of the container until the mound builds up to meet and cover the end of the container neck. At that point, the seed stops flowing. However, as soon as birds arrive to peck and dislodge seed in the mound on the platform, additional seed flows from the container. In that manner, seed dispensing is controlled such that an adequate supply is always available, but unneeded seed is protected within the container until actually needed.

The dispenser with the thermoformed tray is especially suitable for providing water. The container is filled with water, and the tray roof is pushed onto the container threads such that the container neck opening is well below the top of the tray walls. Upon tipping the container and tray upside down, an effective water dispenser is created.

The disposable feed and water dispenser of the present invention may be supported on any flat surface by means of the tray platform. Alternately, the disposable dispenser may be hung from an overhead member. For that purpose, a pair of elongated strips are provided. One end of each strip is bent over 180 degrees. The bent-over ends of the strips are inserted between the container and the cup. The second ends of the strips are hung from the overhead member. In that way, the disposable feed and water dispenser can be hung from above. Like the tray, the strips are preferably made from recyclable polyvinylchloride or polyester material.

Other advantages, benefits, and features of the invention will become apparent to those skilled in the art upon reading the detailed description of the invention.

BRIEF DESCRIPTION OF THE DRAWINGS

FIG. 1 is an exploded perspective view of the disposable feed and water dispenser of the present invention.

FIG. 2 is a longitudinal cross sectional view of the disposable feed and water dispenser.

FIG. 3 is a top view of a blank suitable for fabricating a tray according to the present invention.

FIG. 4 is a partial end view of the disposable feed and water dispenser showing the blank of FIG. 3 formed into the disposable feed dispenser tray according to the present invention.

FIG. 5 is a perspective view of another embodiment of the tray of the present invention.

FIG. 6 is a view similar to FIG. 5 but showing the tray in a fully operative configuration.

FIG. 7 is a cross sectional view taken along lines 7—7 of FIG. 5.

FIG. 8 is a cross sectional view taken along lines 8—8 of FIG. 6 and further showing the tray suspended from a container.

DETAILED DESCRIPTION OF THE INVENTION

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Referring to FIGS. 1 and 2, a disposable feed and water dispenser 1 is illustrated that includes the present invention. The disposable feed and water dispenser is particularly useful for providing seed 3 or water on a long term basis to wild birds, but it will be understood that the invention is not limited to avian applications.

The disposable feed and water dispenser 1 is comprised of a container 5 that preferably is transparent. The container 5 has a large chamber 7 for storing a quantity of water or seed 3. The chamber 7 opens into a neck 9 of relatively small diameter. The external surface of the neck 9 is preferably formed with threads 11. To the container end 13 opposite the neck is fastened a cup 15 that is spaced a slight distance from the container side wall 17.

Removably suspended from the container 5 by means of the neck 9 is a tray 19. The tray 19 has a flat generally rectangular platform 21. Upstanding from two opposed sides of the platform 21 are a pair of parallel plates 23. I prefer that the lengths of the plates 23 be approximately 30 percent to 40 percent of the length of the platform 21. A rather short wall 24 upstands around the periphery of the platform and connects with the plates 23 and with the ends of the respective adjacent walls. The free ends of the plates 23 are joined by a thin walled roof 25. A hole 27 extends through the roof 25. The roof hole 27 is sized to mate snugly with the threads 11 of the container neck 9. Accordingly, the tray is attachable to the container 5 by screwing the tray roof 25 onto the container threads.

The container chamber 7 is filled with seed 3 before the tray 19 is attached to the container 5. The tray 19 is normally screwed onto the container 5 with the container in an upright attitude, that is, with the neck 9 vertically above the chamber end 13. Then the combined container and tray are turned upside down to the attitude shown in FIG. 2. As a result, the tray is suspended from the container, and the seed 3 flows out of the container neck 9 and drops onto the tray platform 21, where it collects in a mound 31. The mound 31 continues to grow until it reaches the end 29 of the neck 9. In that manner, the seed is available to birds alighting on the platform, and the mound is constantly replenished with seed from the container as the seed is eaten from the mound.

Similarly, the container chamber 7 may be filled with water. Upon turning the container 5 and tray 19 upside down, the tray fills with water for ready use by the birds.

It is a feature of the present invention that the tray platform 21 is adjustably positionable relative to the end 29 of the container neck 9. Such adjustability is achieved by the threaded connection between the container neck 9 and the tray roof 25. By adjusting the distance between the container neck end 29 and the tray platform, the height of the seed mound 31 and therefore the quantity of seed 3 in the mound are controllable to enable the disposable dispenser 1 to accommodate different types of seeds. With relatively fine seeds, the platform and neck end are closely spaced in order to prevent excessive seed from flowing onto the platform and being scattered. With relatively coarse seeds, the distance between the container neck end and the platform is increased to assure that the seed does not clog in the container neck. When the disposable dispenser is used to hold water, the distance between the container neck end and the tray platform governs the quantity of water within the tray 19.

If desired, the disposable feed and water dispenser 1 can be used by placing the tray platform 21 on a horizontal surface, not shown. However, I prefer to hang the disposable dispenser from an overhead support typically represented at reference numeral 33. For that purpose, the disposable dispenser further comprises a pair of flexible strips 35. Each strip 35 has a first end 37 with a hole 39 therethrough and a second end 41 that is bent over 180 degrees to lie in facing contact with the strip central portion 43. The bent-over ends 41 of the two strips are inserted diametrically across from each other into the space between the container wall 17 and the cup 15. The ends 37 of the two strips are brought together, and the holes 39 are placed over a hook 45. In that manner, the disposable dispenser is easily and conveniently hung from the support 33.

In FIGS. 1 and 2, the tray 19 is illustrated as being preformed of a relatively rigid material. For example, the tray may be made from a recyclable plastic material by an injection molding process. FIGS. 3 and 4 depict a disposable feed and water dispenser 46 that uses an alternate construction for the tray. The tray 47 of FIGS. 3 and 4 is made from a flat blank 49 that has a cruciform outline. The blank 49 has first oppositely extending arms 51 and 53 and second oppositely extending arms 55 and 57. The outer corners of the arms 51 and 53 are notched at reference numerals 59 and 61, respectively. Fold lines 63 and 65 extend laterally across the arms 51 and 53, respectively, near their outer ends 67 and 69. Another pair of parallel fold lines 71 extend longitudinally along the respective side edges 73 and 75 of the two arms 51 and 53. A final pair of fold lines 77 extend transversely across the arms 55 and 57 near the fold lines 71. A hole 81 is formed in each arm 55 and 57 midway between respective fold lines 77 and the outer ends 83 and 85 of those arms.

The blank 49 is folded at 90 degrees along fold lines 63, 65, and 71 to form a platform 87 with short upstanding walls 89 and opposed upstanding plates 91. The blank is further folded at right angles along fold lines 77 such that the arms 55 and 57 between their respective fold lines 77 and outer ends 83 and 85 form two overlapping roof sections 93 and 95. The holes 81 in the roof sections 93 and 95 are aligned with each other, and the tray 47 is complete. To attach the container 5' to the tray 47, the threads of the neck 9' of the container 5' are then adjustably screwed into the aligned holes 81.

Turning to FIGS. 5–8, a further modified disposable feed and water dispenser 101 is depicted. The disposable feed and water dispenser 101 includes a container 103 that may be identical to the containers 5 and 5' used with the disposable dispensers 1 and 46 described previously. The tray 105 of the disposable dispenser 101 is made by a thermoforming process in which a thin sheet of material is draped over an appropriately shaped and heated die, as is known in the art. The tray 105 is formed with a base 107 having double opposed end walls 109 and double opposed side walls 111. If desired, the side walls 111 may be contoured to give the base 107 the general hourglass outline shown in FIGS. 5 and 6. The inner walls of the respective double end and side walls 109 and 111, respectively, connect with a flat platform 112.

Integral with each of the outer walls of the double side walls 111 is a respective plate 113, 114. A skip score line 115 is cut into the junction of one end of each plate 113, 114, and its associated outer side wall, thereby rendering the plates very easy to bend along the skip score lines. The second end of each plate joins one end of a respective panel 117, 119. The panels 117 and 119 lie in planes perpendicular to the planes of their associated plates. In the illustrated construction, the panel 117 is fabricated with two sides 120 and 121, two ends 122, and a top 123 that define an open bottom enclosure. Similarly, the panel 119 has two sides 124 and 125, two ends 126, and a top 27. However, other constructions for the panels are possible without departing from the essence of the invention.

A semi-frusto conical surface 129 extends between the sides 120, 121 and the top 123 of the panel 117. A similar semi-frusto-conical surface 131 extends between the sides 124, 125 and the top 127 of the panel 119. The semi frusto conical surfaces 129 and 131 terminate in respective semi circular edges 133 and 134 at their respective junctions with the corresponding panel sides 120 and 124.

The panels 117 and 119 are formed with an interlocking catch arrangement. In the particular catch arrangement shown, a pair of cylindrical buttons 137 are formed in the top 127 of the panel 119. Mating cavities 135 are formed in the top 123 of the panel 117. The diameter of the cavities 135 is slightly less than the outer diameter of the cylindrical buttons 137. It will be appreciated, of course, that catch arrangements other than the button and cavity designs shown may be utilized.

To use the tray 105, the two plates 113, 114 are folded along their respective skip score lines 115 such that the two panels lie alongside the tray opposed walls 111. That folding causes the panels 117 and 119 to overlie the tray parallel to the tray platform 112 to create a tray roof 141. The catch arrangement, such as the buttons 137 and cavities 135 depicted, secure the two panels of the roof 141 in place. The two semi-frusto conical surfaces 129 and 131 and the two semi circular edges 133 and 134 cooperate to form a frusto conical surface with an opening that is suitable for receiving the neck threads 142 of the container 103. If desired, the two panels 117 and 119 can be snapped together by the catch arrangement such that the panel surfaces 120 and 124 of the roof 141 rest on the container neck flange 143, as is shown in FIG. 8.

A very important aspect of the disposable feed and water dispensers 1, 14, and 101 of the present invention is that they lend themselves very well to being manufactured completely from recyclable materials. A preferred material for the containers 5, 5', and 103 is PET plastic. In keeping with the low cost and disposable nature of the disposable feed dispenser, conventional PET beverage bottles may be utilized as the containers. A satisfactory material for the hanging strips 35, tray 47, and tray 105 is sheet polyvinylchloride or polyester having a thickness of approximately .02 inches. A tray 47 made from a blank 49 of 0.02 inches polyvinylchloride has the further advantage of possessing a certain amount of elasticity such that a residual force exists in the formed tray that tends to return the tray to the flat blank 49. As a result, a friction force is set up at the junction between the container neck 9 and the holes 81 of the tray roof sections 93 and 95. The friction force serves to inhibit loosening of the threaded connection between the tray 47 and the container 5'.

When the containers 5, 5' or 103 is empty of seed or water, the entire disposable feed and water dispenser 1, 14, or 101 is recycled and replaced with a new one. The low cost and convenience of the disposable dispensers enable a person to always have a neat and clean source of bird food or water available without adversely affecting the environment.

Thus, it is apparent that there has been provided, in accordance with the invention, a disposable feed and water dispenser that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A disposable feed and water dispenser comprising:
   a. a container having a wall that defines an interior chamber having first and second ends for storing selected feed or water and an open neck leading to the chamber first end, the feed or water flowing out of the container open neck when the container is oriented with the first end located under the second end; and b. tray means removably suspended from the container neck for collecting and regulating the flow of the feed or water from the container, wherein the tray means comprises:
   i. a platform having opposed sides and a predetermined length;
   ii. a pair of plates upstanding from the platform opposed sides; and
   iii. a roof joined to the pair of plates and being generally parallel to and spaced from the platform and overlying a portion of the platform, the roof defining a hole therethrough that removably receives the neck of the container, so that the tray means is generally open from the top to provide access to the feed and water on the platform from the top thereof.

2. A disposable feed and water dispenser comprising:
a. a container having a wall that defines an interior chamber having first and second ends for storing selected feed or water and an open neck leading to the chamber first end, the feed or water flowing out of the container open neck when the container is oriented with the first end located under the second end;
b. tray means removably suspended from the container neck for collecting and regulating the flow of the feed or water container;
c. a cup fastened to the exterior of the container wall adjacent the second end thereof; and
d. a pair of strips having respective bent-over first ends that are inserted between the cup and the chamber wall and respective ends that are hung from a selected member, so that the disposable dispenser can be hung from the selected member by the strips.

3. A disposable feed and water dispenser comprising:
a. a container having a wall that defines an interior chamber having first and second ends for storing selected feed or water and an open neck leading to the chamber first end, the feed or water flowing out of the container open neck when the container is oriented with the first end located under the second end; and
b. tray means removably suspended from the container neck for collecting and regulating the flow of the feed or water container, wherein the try means comprises:
   i. a platform having opposed sides and a predetermined length;
   ii. a pair of plates upstanding from the platform opposed sides; and
   iii. a roof joined to the pair of plates and being generally parallel to and spaced from the platform, the roof defining a hole therethrough that removably receives the neck of the container, wherein the container neck is formed with threads that mate with the roof to thereby enable the location of the container neck to be adjusted relative to the tray platform, so that the distance between the container neck and the tray platform controls the amount of feed or water flowing from the container and collected on the tray platform.

4. A disposable feed and water dispenser comprising:
a. a container having a wall that defines an interior chamber having first and second ends for storing selected feed or water and an open neck leading to the chamber first end, the feed or water flowing out of the container open neck when the container is oriented with the first end located under the second end; and
b. tray means removably suspended from the container neck for collecting and regulating the flow of the feed or water container, wherein the tray means comprises:
   i. a platform having opposed sides and a predetermined length;
   ii. a pair of plates upstanding from the platform opposed sides; and
   iii. a roof joined to the pair of plates and being generally parallel to and spaced from the platform, the roof defining a hole therethrough that removably receives the neck of the container, wherein the tray means is fabricated from a planar blank of material having a generally cruciform shape with first and second opposed arms having respective longitudinal edges and third and fourth opposed arms, the blank having a pair of first fold lines along which the respective third and fourth arms are folded to be perpendicular to the plane of the first and second arms, the blank having a pair of second fold lines across the respective third and fourth arms along which the third and fourth arms are further folded to create respective roof sections that are in overlapping facing contact parallel to and spaced from the plane of the first and second arms, the roof sections defining respective holes therethrough that are aligned to create the hole that receives the container neck.

5. The disposable feed dispenser of claim 4 wherein the blank first fold lines are parallel to and spaced a short distance from the respective longitudinal edges of the first and second arms,
so that short walls are created that are perpendicular to and upstanding from the longitudinal edges of the first and second arms when the third and fourth arms are folded along the first fold lines.

6. The disposable dispenser of claim 4 wherein the container is fabricated from a recyclable PET material, and wherein the tray is fabricated from a sheet of recyclable polyvinylchloride or polyester material approximately 0.2 inches thick.

7. A disposable fed and water dispenser comprising:
a. a container having a wall that defines an interior chamber having first and second ends for storing selected feed or water and an open neck leading to the chamber first end, the feed or water flowing out of the container open neck when the container is oriented with the first end located under the second end; and
b. tray means removably suspended from the container neck for collecting and regulating the flow of the feed or water from the container, wherein the tray means comprises:
   i. a generally open platform having opposed sides and a predetermined length;
   ii. a pair of plates upstanding from the platform opposed sides, wherein the pair of plates have respective first ends jointed to the platform opposed sides and respective second ends, the plates being foldable along their first ends so as to be perpendicualr to the platform; and iii. a roof joined to the pair of plates and being generally parallel to and spaced from the platform, the roof defining a hole therethrough that removably receives the neck of the container, wherein the roof comprises:

a pair of panels joined at respective first ends thereof to the second ends of the respective plates and being generally perpendicular thereto, each panel having a second end that defines an opening therethrough; and catch means on the panels for securing the panels in place parallel to and overlying the platform when the plates are folded to be perpendicular to the platform, the panel openings in the panel second ends cooperating to receive the neck of the container.

8. The disposable dispenser of claim 7 wherein:
   a. the opening in the second end of each panel is semi-circular in shape; and
   b. the second ends of the panels abut when the plates are folded to be perpendicular to the platform opposed sides and the panels overlie and are parallel to the platform and the semi-circular opening so the panels cooperate to create a circular opening that receives the container neck.

9. The disposable dispenser of claim 8 wherein the catch means comprises at least one button formed in the second end of one of the panels and at least cavity formed in the second end of the other of the panels, the button and cavity engaging each other to secure the panels in place and to form the tray roof when the plates are folded to be perpendicular to the platform.

10. Apparatus for storing and dispensing seed or water comprising:
   a. a container holding the seed or water and having an upper end and a lower end, the lower end defining a neck through which the seed or water flows from the container;
   b. a tray adjustably suspended from the container neck and comprising platform means located at a selected distance from the container neck for cooperating with the container neck to regulate the flow of seed or water from the container and for collecting the seed or water that flows from the container;
   c. a cup loosely fastened to the container upper end; and
   d. at least one strip having a first end inserted between the container and the cup and a second end that is hangable from a selected member to thereby hang the container and tray from the selected member.

11. Apparatus for storing and dispensing seed or water comprising:
   a. a container holding the seed or water and having an upper end and a lower end, the lower end defining a neck through which the seed or water flows from the container;
   b. a generally open top tray adjustably suspended from the container neck and comprising platform means located at a selected distance from the container neck for cooperating with the container neck to regulate the flow of seed or water from the container and for collecting the seed or water that flows from the container, wherein the tray further comprises:
      i. a pair of flat parallel plates upstanding from the platform means; and
      ii. a generally continuous planar roof joined to the plates and spaced above the platform means and overlying a portion of the platform means, the roof having a hole therethrough that receives the container neck.

12. Apparatus for storing and dispensing seed or water comprising:
   a. a container holding the seed or water and having an upper end and a lower end, the lower end defining a neck through which the seed or water flows from the container; and
   b. a tray adjustably suspended from the container neck and comprising platform means located at a selected distance from the container neck for cooperating with the container neck to regulate the flow of seed or water from the container and for collecting the seed or water that flows from the container, wherein the tray further comprises;
      i. a pair of plates upstanding from the platform means; and
      ii. a roof joined to the plates and spaced above the platform means, the roof having a hole therethrough that receives the container neck, wherein the container neck is formed with external threads that are threadable into the roof hole to thereby enable the tray platform means to be located at the selected distance from the container neck.

13. Apparats for storing and dispensing seed or water comprising:
   a. a container holding the seed or water and having an upper end and a lower end, the lower end defining a neck through which the seed or water flows from the container; and
   b. a tray adjustably suspended from the container neck and comprising platform means located at a selected distance from the container neck for cooperating with the container neck to regulate the flow of seed or water from the container and for collecting the seed or water that flows from the container, wherein the tray is fabricated from a planar blank of material that has a generally cruciform shaped with opposed first and second arms and opposed third and fourth arms having respective end edges, the third and fourth arms being folded along respective first fold lines at 90 degrees to the plane of the first and second arms and being further folded along respective second fold lines to form respective roof sections lying between the second fold lines and the end edges of the third and fourth arms, the roof sections of the third and fourth arms being in overlapping facing contact and parallel and spaced from the plane of the first and second arms, the roof sections defining respective holes therethrough that are aligned to receive the container neck.

14. Apparatus for storing and dispensing seed or water comprising:
   a. a container holding the seed or water and having an upper end and a lower end, the lower end defining a neck through which the seed or water flows from the container; and
   b. a tray adjustably suspended from the container neck and comprising platform means located at a selected distance from the container neck for cooperating with the container neck to regulate the flow of seed or water from the container and for collecting the seed or water that flows from the container, wherein:
  i. the platform means comprises:
     a flat platform;
     first and second pairs of opposed inner walls joined to and upstanding from the platform; and
     first and second pairs of opposed outer walls joined to and surrounding respective inner walls, and
  ii. the tray further comprises;
     a pair of plates having respective first ends joined to the first pair of opposed outer walls along respective fold lines that are approximately coplanar with the platform and respective second ends;
     a pair of panels, each panel having a first end joined to the second end of an associated plate and extending at a right angle thereto, and a second end formed with an opening therein, the plates being foldable along their respective fold lines to lie alongside the first pair of opposed outer walls and thereby locate the panels over the platform and parallel thereto with the openings of the second ends of the platforms cooperating to form an opening that receives the container neck; and
     catch means for securing the panels to each other when they overlie the platform,
  so that the tray is suspended from the container by the cooperation of the container neck and the openings in the panels.

15. A method of dispensing bird seed comprising the steps of:
  a. providing a container having a storage chamber containing the seed and an open neck at one end of the container that opens into the chamber;
  b. orienting the container with the neck above the chamber;
  c. providing a tray with a roof having a hole therethrough and a platform parallel to and spaced from the roof;
  d. attaching the tray roof to the container neck;
  e. turning the tray and container such that the neck is below the chamber to thereby cause the seed to flow out the chamber neck;
  f. collecting the seed in a mound on the tray platform under the container neck;
  g. loosely fastening a cup to the container at the end thereof opposite the neck;
  h. providing a pair of strips having respective first and second ends;
  i. inserting one end of each strip between the cup and the container; and
  j. hanging the second ends of the strips from a selected member to thereby hang the container and tray from the selected member.

16. A method of dispensing bird seed comprising the steps of:
  a. providing a container having a storage chamber containing the seed and an open neck at one end of the container that opens into the chamber;
  b. orienting the container with the neck above the chamber;
  c. providing a tray with a roof having a hole therethrough and a platform parallel to and spaced from the roof;
  d. attaching the tray roof to the container neck, wherein the step of attaching the tray roof to the container neck comprises the step of adjustably threading the tray roof onto the container neck to thereby locate the container neck at a selected distance from the tray platform;
  e. turning the tray and container such that the neck is below the chamber to thereby cause the seed to flow out the chamber neck; and
  f. collecting the seed in a mound on the tray platform under the container neck.

17. A method of dispensing bird seed comprising the steps of:
  a. providing a container having a storage chamber containing the seed and an open neck at one end of the container that opens into the chamber;
  b. orienting the container with the neck above the chamber;
  c. providing a tray with a roof having a hole therethrough and a platform parallel to and spaced from the roof;
  d. attaching the tray roof to the container neck;
  e. turning the tray and container such that the neck is below the chamber to thereby cause the seed to flow out the chamber neck; and
  f. collecting the seed in a mound on the tray platform under the container neck, wherein the step of collecting the seed on the tray platform in a mound comprises the step of regulating the flow of the seed from the container to the mound, and wherein the step of regulating the flow of the seed comprises the step of threading the container neck within the tray roof to locate the container neck at a predetermined distance from the tray platform to thereby control the height of the mound of seed between the platform and the container neck.

18. A method of dispensing bird seed comprising the steps of:
  a. providing a container having a storage chamber containing the seed and an open neck at one end of the container that opens into the chamber;
  b. orienting the container with the neck above the chamber;
  c. providing a tray with a roof having a hole therethorugh and a platform parallel to and spaced from the roof, wherein the step of providing a tray comprises the steps of:
     i. providing a planar blank of material having a generally cruciform shape with first and second opposed arms and third and fourth opposed arms;
     ii. folding the third and fourth arms transversely along respective first fold lines such that the third and fourth arms are generally perpendicular to the plane of the first and second arms;
     iii. folding the third and fourth arms along respective second fold lines to create respective roof sections that overlap each other and are parallel to and spaced from the first and second arms; and
     iv. forming a hole in each of the roof sections, the holes being aligned with each other;
  d. attaching the tray roof to the container neck;
  e. turning the tray and container such that the neck is below the chamber to thereby cause the seed to flow out the chamber neck; and
  f. collecting the seed in a mound on the tray platform under the container neck;

19. A generally open top tray useful for holding bird seed or water comprising:
   a. a flat platform having upstanding sides;
   b. at least two plates upstanding from the platform sides and having respective free ends; and
   c. a roof joined to the free ends of the plates and overlying a portion of the platform, the roof defining a hole therethorugh for receiving a selected container that holds the seed or water,
   so that seed or water from the container can flow therefrom through the roof hole and be collected on the tray platform and be accessible from the tray open top.

20. A tray useful for holding bird seed or water comprising:
   a. a flat platform having opposed sides;
   b. a plate upstanding from each platform side and having a free end; and
   c. a roof joined to the free ends of the plates, the roof defining a hole therethrough for receiving a selected container that holds the seed or water wherein:
      i. each plate has a first end joined to an associated platform side along a fold line and a second end;
      ii. the roof is fabricated as a pair of panels, each panel having a first end joined to the second end of an associated plate and extending at right angles thereto and a second end, the second end of each panel defining a generally semi-circular opening therethrough, the plates being foldable along their respective fold lines to lie alongside the associated platform sides with the roof panels overlying and parallel to the platforms, the openings in the panels cooperating to receive the selected container therein; and
      iii. the tray further comprises catch means for securing the roof panels to each other when the panels overlie the platform.
   so that seed or water from the container can flow therefrom through the roof hole and be collected on the tray platform.

21. A blank of material foldable into a tray, the blank comprising:
   a. a generally rectangular platform having parallel longitudinal side edges;
   b. first and second generally rectangular plates having respective first and second ends, the first end of each plate being joined to an associated longitudinal side edge of the platform by a respective first fold line; and
   c. first and second roof sections joined to the second edges of the respective first and second plates by respective second fold lines, each roof section defining a hole therethrough,
   so that the first and second plates can be folded along the respective first fold lines to be perpendicular to the platform and the first and second roof sections can be folded along the respective second fold lines to be parallel to the platform with the first and second roof sections being in overlapping facing contact and the holes in the roof sections being aligned with each other.

22. The blank of claim 21 wherein the blank is made from a recyclable sheet of polyvinylchloride or polyester approximately 0.02 inches thick.

* * * * *